United States Patent
Smith et al.

(10) Patent No.: US 8,790,736 B2
(45) Date of Patent: Jul. 29, 2014

(54) SAVORY GRANOLA CLUSTER SNACK FOOD

(71) Applicant: Frito-Lay North America, Inc., Plano, TX (US)

(72) Inventors: R. Todd Smith, Plano, TX (US); Alex Tipton, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 79 days.

(21) Appl. No.: 13/632,470

(22) Filed: Oct. 1, 2012

(65) Prior Publication Data

US 2014/0093635 A1 Apr. 3, 2014

(51) Int. Cl.
*A23L 1/182* (2006.01)

(52) U.S. Cl.
USPC ........... 426/618; 426/517; 426/519; 426/629; 426/632; 426/601; 426/808; 426/810

(58) Field of Classification Search
CPC ..... A23L 1/182; A23L 1/1643; A23L 1/0023; A23L 1/0026; A23L 1/36; A23L 1/30; A23L 1/10; A23L 1/1016; A23P 1/10
USPC ......... 426/517, 519, 601, 618, 629, 632, 808, 426/810
See application file for complete search history.

(56) References Cited

U.S. PATENT DOCUMENTS

| | | | |
|---|---|---|---|
| 4,038,427 A * | 7/1977 | Martin | 426/285 |
| 6,800,310 B2 * | 10/2004 | Squire et al. | 426/96 |
| 2004/0219280 A1 | 11/2004 | Green et al. | |
| 2009/0148563 A1 | 6/2009 | Schuette et al. | |
| 2009/0208609 A1 | 8/2009 | Lawson et al. | |
| 2010/0136195 A1 | 6/2010 | Coleman | |
| 2010/0183772 A1 * | 7/2010 | Clanton et al. | 426/93 |
| 2011/0104356 A1 * | 5/2011 | Coleman et al. | 426/573 |
| 2011/0212226 A1 * | 9/2011 | Soane et al. | 426/96 |

OTHER PUBLICATIONS

International Search Report and Written Opinion mailed Jan. 31, 2014, for PCT/US2013/062871 (12 pages).

* cited by examiner

*Primary Examiner* — Helen F Heggestad
(74) *Attorney, Agent, or Firm* — Colin P. Cahoon; Celina M. Orr; Carstens & Cahoon, LLP

(57) ABSTRACT

The present invention discloses a snack food product having savory granola clusters that is rich in whole grains, fibers and nuts, designed to provide a satisfying snack between meals or in place of a meal.

25 Claims, 2 Drawing Sheets

SAVORY GRANOLA CLUSTER SNACK FOOD

BACKGROUND OF THE INVENTION

1. Technical Field

The present invention relates to an improved snack food product and more particularly to a snack food product that incorporates a savory granola component along with nuts to provide a good source of fiber and whole grains.

2. Description of Related Art

Snack food items that are typically sold to consumers take the form of snack chips or other discrete, crispy snack sized pieces of food. Furthermore, these snack-sized pieces of food are sold to consumers in packages that contain a single type of snack food item. For example, a store shelf could be stocked with several packages of nacho cheese flavored tortilla chips, several packages of plain tortilla chips, and several packages of corn chips. Sometimes, however, different snack food items are mixed together before packaging. One example of a snack food mixture is known colloquially as trail mix. Trail mix is a mixture of nuts, such as peanuts or cashews, and partially dried fruit, like raisins or dried cranberries. Many of these snack mixtures contain granola.

Granola is also incorporated into snack bars, sometimes with different components such as nuts, other grains, or dried fruit. These granola bars may be eat as a snack or as a meal replacement.

Often the granola used in snack mixtures or snack bars is seasoned or mixed with other components to achieve an overall sweet taste. The present invention is directed toward providing a snack food product with a savory, as opposed to sweet, granola.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE INVENTION

Figure 1:
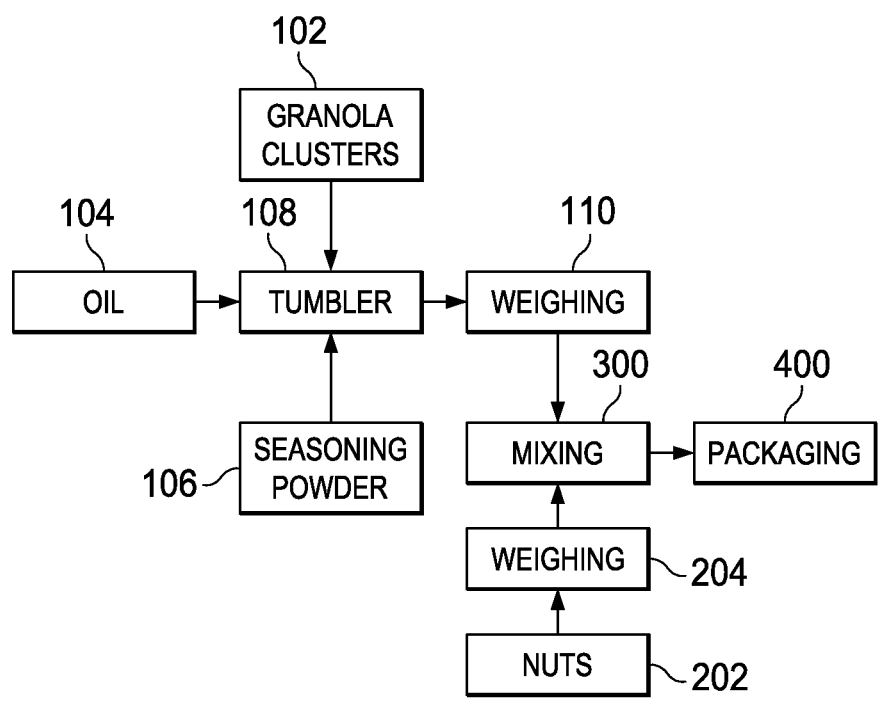
FIG. 1 is a flowchart indicating the processing steps for one embodiment of the present invention.

The snack food product of the present invention is rich in whole grains, fibers and nuts, designed to provide a satisfying snack between meals or in place of a meal. The particular components of the snack food product disclosed herein were chosen to deliver at least 2.5 grams of fiber per one ounce serving of the snack food product. Other nutritional goals for the snack food product include the following: about 7 grams or less of total fat, about 200 milligrams or less of sodium, about 14 grams of carbohydrates and about 5 grams of protein. The snack food product may be presented to the consumer in a number of forms. In one embodiment, the snack food product is a snack mixture or a snack bar.

One component of the snack mixture is seasoned granola. Granola is beneficial because it provides a good source of whole grains and is low in sugar. In a preferred embodiment, the granola component is comprised of savory granola clusters. As used herein, the term "savory granola cluster" means an agglomeration of a plurality of granola pieces held together by a binder that imparts little to no sweetness. In one embodiment, the binder used is soluble corn fiber, which is about 70% to about 80% dietary fiber. An example of granola clusters suitable for use in the present invention can be obtained from 21ST CENTURY GRAIN PROCESSING®, under the brand VITERRA® Savory Oat Cluster. The protein content of the granola clusters may be increased to about 20% to about 30% by adding soy protein isolates or soy protein concentrates to the clusters.

The granola clusters are coated with oil and a seasoning. The seasoning process is performed by placing the granola clusters in a rotatable tumbler, adding oil to coat the clusters and then adding seasoning powder which adheres to the oil-coated granola clusters. The preferred ratio of ingredients placed in the tumbler, by weight of the total mixture in the tumbler, is about 70% to about 80% granola clusters, about 5% to about 15% oil and about 5% to about 15% seasoning powder, but one skilled in the art will understand that the ratio can be manipulated to obtain the desired level of seasoning. In one embodiment, the oil used to coat the granola clusters is selected from vegetable oil, peanut oil, soybean oil, sunflower oil or cottonseed oil. The seasoning powder can be any mixture of cheese, dairy powders, salt, spices and fillers such as maltodextrins. In one embodiment, the seasoning powder used is cheddar barbeque or zesty queso, each of which can be obtained from McCormick & Company, Inc.

Another component of the inventive snack mix is nuts. As used herein, the term "nut" is used in the culinary sense and includes any large, oily kernel found within a shell and used in food. Examples of nuts include, without limitation, peanut, almond, pistachio, cashew, Brazil nut, pecan, hazelnut and walnut. In one embodiment, almonds are used due to their high fiber content as compared to other nuts and perceived health benefits. Peanuts are also used in one embodiment for their flavor and because they are relatively inexpensive. The nuts used herein may be oil-roasted, dry-roasted, raw, blanched, unblanched, salted or unsalted, full-fat or partially defatted.

In one embodiment, the inventive snack food product is composed of, by weight of the total snack product, about 20% to about 80% seasoned savory granola clusters and about 15% to about 50% nuts. The savory granola clusters are coated with oil and a seasoning powder, each of which comprise about 0% to about 15% by weight of the total snack mixture. In another embodiment, the inventive snack food product is composed of, by weight of the total snack product, about 50% to about 60% seasoned savory granola clusters and about 35% to about 45% nuts. The savory granola clusters are coated with oil and a seasoning powder, each of which comprise about 3% to about 8% by weight of the total snack mixture. In another embodiment, the snack mixture is, by weight of the total snack mixture, about 50% to about 55% seasoned savory granola clusters, about 24% to about 26% peanuts and about 14% to about 16% almonds. The savory granola clusters are coated with oil and a seasoning powder, each of which comprise about 4% to about 5% by weight of the total snack mixture. The snack food product described has less than about 8 grams of fat, about 1.5 grams or less of saturated fat, about 0 grams of trans-fatty acids, less than about 240 milligrams of sodium, about 14 grams or less of carbohydrates, at least about 3 grams of fiber and at least about 4 grams of protein.

In another aspect of the present invention, seeds, dried fruit pieces, chocolate pieces or nutritional supplements are included in the snack mixture. As used herein, the term "seed" is used in the culinary sense and includes any small, oily kernel found within a shell and used in food. Examples of seeds are pumpkin seeds, sesame seeds, soybeans, sunflower seeds and flax seeds. The types of dried fruit pieces that may be used in accordance herein are osmotically dehydrated, vacuum fried pieces of fruit or a freeze-dried pieces of fruit, both of which comprise a moisture content less than about 4% by weight. Examples of osmotically dehydrated and vacuum fried fruits are apple slices, pineapple pieces and mango pieces. Examples of freeze-dried fruits are whole raspberries, strawberry slices and banana slices. As used herein, the term "nutritional supplement" is a material, generally a vitamin or a mineral, added to a product to restore the nutritional contents degraded from processing. Examples of nutritional supplements that may be used are B-vitamins, antioxidant vitamins (i.e., A-vitamins or C-vitamins), or minerals such as iron, magnesium, phosphorus, potassium or zinc.

FIG. 1 depicts a flowchart for the method of producing one embodiment of the present invention, a snack mixture. As shown therein, each of the components of the snack mixture are processed, if necessary, in different streams, weighed, and then packaged together. To make the seasoned savory granola clusters, savory granola clusters 102, oil 104 and seasoning powder 106 are introduced into a tumbler 108, which is rotated to coat the savory granola clusters 102 with the oil 104 and seasoning powder 106 to produce seasoned savory granola clusters. Once the granola clusters are sufficiently coated with the oil and seasoning, the seasoned savory granola clusters are weighed 110 prior to mixing 300. The nuts 202 are weighed 204 prior to mixing 300. After the seasoned savory granola clusters and nuts are mixed 300 to form the snack mixture, the snack mixture is packaged 400. This represents one embodiment of the present invention, it being understood that other intermediate steps may also occur. Because all of the discrete snack pieces used in the mixture of the present invention comprise a moisture content less than 4% by weight, all of the components of the present invention are preferably crispy and allows the components to be packaged in the same headspace and enjoy a long shelf life because moisture will not migrate from one crispy food to another.

Figure 2:
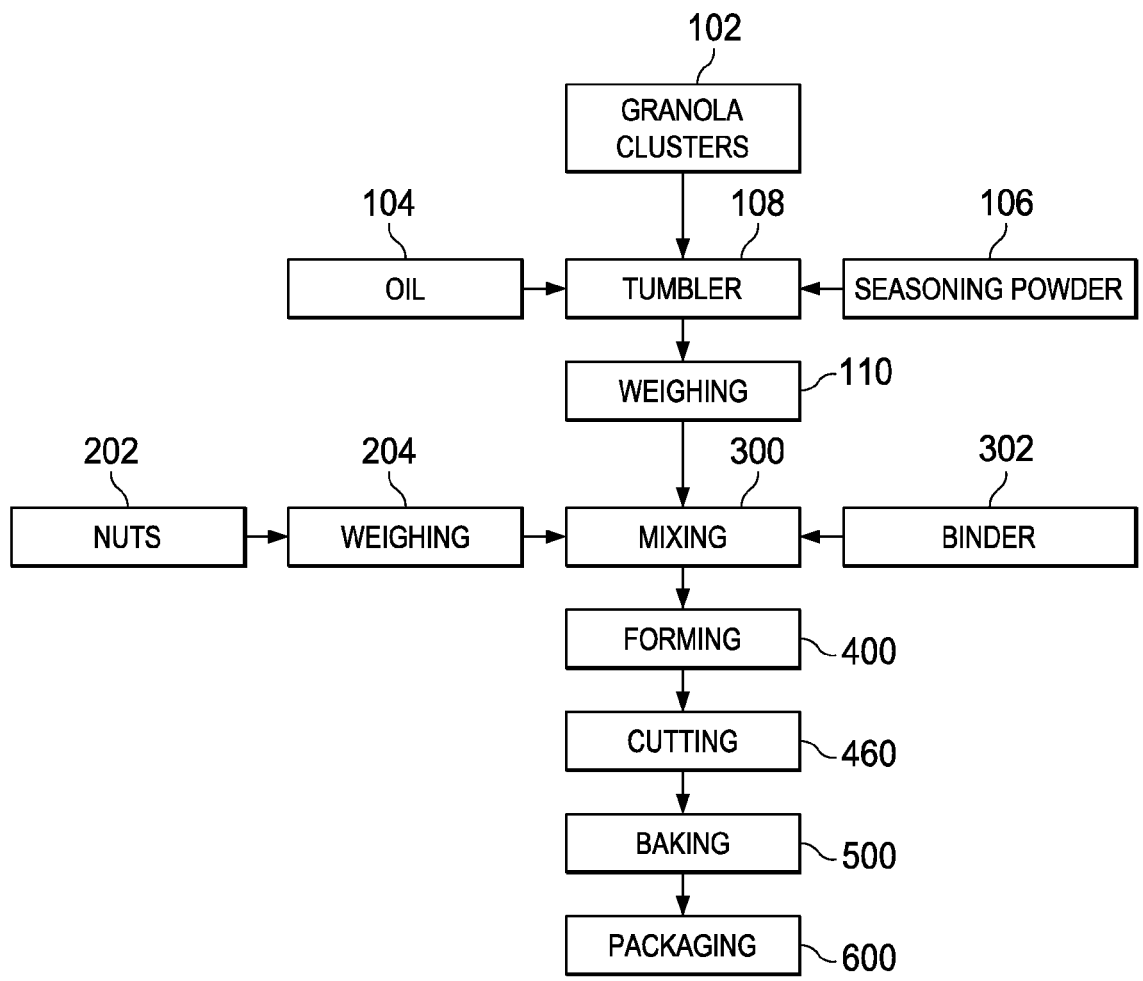
FIG. 2 is a flowchart indicating the processing steps for another embodiment of the present invention.

FIG. 2 depicts a flowchart for the method of producing one embodiment of the present invention, a snack bar. To make the seasoned savory granola clusters, savory granola clusters 102, oil 104 and seasoning powder 106 are introduced into a tumbler 108, which is rotated to coat the savory granola clusters 102 with the oil 104 and seasoning powder 106 to produce seasoned savory granola clusters. Once the granola clusters are sufficiently coated with the oil and seasoning, the seasoned savory granola clusters are weighed 110 prior to mixing 300. The nuts 202 are weighed 204 prior to mixing 300. The seasoned savory granola clusters and nuts 202 are mixed 300 with a binder 302 to form a mixture. In one embodiment, the binder used is soluble corn fiber. The mixture is then formed 400 into snack bars by any means known in the art. In one embodiment, the mixture is first formed 400 into a slab with a thickness of about 0.5 inches to about 1.5 inches and the slab is cut 460 into snack size bars with a length of about 3 inches to about 5 inches. In one embodiment, the slab thickness is about 0.75 inches and the bars have a length of about 4 inches. The bars are baked for about 10 minutes to about 25 minutes at a temperature of about 300° F. to about 400° F. to a final moisture content of about 4% or less. In one embodiment, the bars are baked for about 15 minutes at a temperature of about 350° F. The snack bars are then packaged 600. This represents one embodiment of the present invention, it being understood that other intermediate steps may also occur.

The snack food product of the present invention is not only nutritious, but it also scores well in consumer tests. Specifically, in one embodiment, the snack food product has Appearance Liking, Texture Liking, Flavor Liking and Aftertaste Liking Scores of at least 7.0. As used herein, the term "Appearance Liking Score" means the average rating given by at least 60 consumers on a 9-point scale, with 1 being the lowest score and 9 being the highest score, in response to the question "How well do you like the appearance of this sample?", after eating at least one of each component of the snack food product. Similarly, the term "Texture Liking Score" means the average rating given by at least 60 consumers the same 9-point scale in response to the question "How well do you like the texture of this sample?", after eating at least one of each component of the snack food product; the term "Flavor Liking Score" means the average rating given by at least 60 consumers the same 9-point scale in response to the question "How well do you like the flavor of this sample?", after eating at least one of each component of the snack food product; and the term "Aftertaste Liking Score" means the average rating given by at least 60 consumers the same 9-point scale in response to the question "How well do you like the aftertaste of this sample?", after eating at least one of each component of the snack food product.

FIRST EXAMPLE

A first snack mixture was prepared in accordance with the present invention. The ingredients and their relative amounts (by weight) that were used to make 100 grams of the snack mixture are as follows: about 50% granola clusters, about 25% salted peanuts, about 15% hickory smoked almonds, about 5.0% vegetable oil, and about 5.0% McCormick Cheddar BBQ seasoning. This snack mix contains about 8 grams of total fat, about 1.5 grams of saturated fat, about 0 grams of trans-fatty acids, about 230 milligrams of sodium, about 14 grams of carbohydrates, about 3 grams of dietary fiber, about 2 grams of sugars, and about 4 grams of protein. This snack mixture had an Appearance Liking Score of 7.1, a Texture Liking Score of 7.5, a Flavor Liking Score of 7.5, and an Aftertaste Liking Score of 6.8.

SECOND EXAMPLE

A second snack mixture was prepared in accordance with the present invention. The ingredients and their relative amounts (by weight) that were used to make 100 grams of the snack mixture are as follows: about 50% granola clusters, about 25% peanuts, about 15% roasted almonds, about 5.0% vegetable oil, and about 5.0% McCormick Zesty Queso seasoning. This snack mix contains about 8 grams of total fat, about 1.5 grams of saturated fat, about 0 grams of trans-fatty acids, about 230 milligrams of sodium, about 14 grams of carbohydrates, about 3 grams of dietary fiber, about 2 grams of sugars, and about 4 grams of protein. This snack mixture had an Appearance Liking Score of 7.4, a Texture Liking Score of 7.5, a Flavor Liking Score of 7.4, and an Aftertaste Liking Score of 7.0.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

ADDITIONAL DISCLOSURE

1. A snack food product comprising by weight of the total snack food product:
    about 20% to about 80% savory granola clusters coated with oil and a seasoning powder, said oil comprising about 0% to about 15% and said seasoning powder comprising about 0% to about 15%; and
    about 15% to about 50% nuts.
2. The snack food product of any preceding claim wherein said snack food product is a snack mixture.
3. The snack food product of any preceding claim wherein said snack food mixture is a snack bar.
4. The snack food product of any preceding claim wherein said nuts comprise peanuts and almonds.
5. The snack food product of any preceding claim wherein said nuts are selected from the group consisting of peanuts, almonds, pistachios, cashews, Brazil nuts, pecans, hazelnuts and walnuts.
6. The snack food product of any preceding claim comprising by weight of the total snack food product:
    about 50% to about 60% savory granola clusters coated with oil and a seasoning powder, said oil comprising about 3% to about 8% and said seasoning powder comprising about 3% to about 8%; and
    about 35% to about 45% nuts.
7. The snack food product of any preceding claim comprising by weight of the total snack mixture:
    about 50% to about 55% savory granola clusters coated with oil and a seasoning powder, said oil comprising about 4% to about 5% and said seasoning powder comprising about 4% to about 5%;
    about 24% to about 26% peanuts; and
    about 14% to about 16% almonds.
8. The snack food product of any preceding claim wherein said oil is selected from the group consisting of vegetable oil, peanut oil, soybean oil, sunflower oil or cottonseed oil.
9. The snack food product of any preceding claim further comprising seeds, dried fruit pieces, chocolate pieces or nutritional supplements.
10. The snack food product of any preceding claim further comprising an Appearance Liking Score, Texture Liking Score, Flavor Liking Score, and Aftertaste Liking Score of at least 7.0.
11. The snack food product of any preceding claim additionally comprising per ounce of said snack food product:
    less than about 8 grams of fat;
    about 1.5 grams or less of saturated fat;
    about 0 grams of trans-fatty acids;
    less than about 240 milligrams of sodium;
    about 14 grams or less of carbohydrates;
    at least about 3 grams of fiber;
    at least about 8 grams of whole grains; and
    at least about 4 grams of protein.
12. A method of making a snack mixture, said method comprising:
    a) providing savory granola clusters, oil and a seasoning powder to a tumbler;
    b) tumbling said savory granola clusters, said oil and said seasoning powder to produce seasoned savory granola clusters, wherein said seasoned savory granola clusters comprise about 0% to about 15% oil by weight of the total snack mixture and about 0% to about 15% seasoning powder by weight of the total snack mixture;
    c) providing nuts; and
    d) mixing said seasoned savory granola clusters and said nuts to produce said snack mixture, wherein said snack mixture comprises by weight of the total snack mixture:
        about 20% to about 80% savory granola clusters; and
        about 15% to about 50% nuts.
13. The method of any preceding claim wherein providing said oil in step a) further comprises providing an oil selected from the group consisting of vegetable oil, peanut oil, soybean oil, sunflower oil or cottonseed oil.
14. The method of any preceding claim wherein providing said nuts in step c) further comprises providing peanuts and almonds.
15. The method of any preceding claim wherein providing said nuts in step c) further comprises providing nuts selected from the group consisting of peanuts, almonds, pistachios, cashews, Brazil nuts, pecans, hazelnuts and walnuts.
16. The method of any preceding claim wherein said seasoned savory granola clusters produced in step b) further comprise about 3% to about 8% oil by weight of the total snack mixture and about 3% to about 8% seasoning powder by weight of the total snack mixture and further wherein said snack mixture produced by said mixing in step d) further comprises by weight of the total snack mixture:
    about 50% to about 60% savory seasoned granola clusters; and
    about 35% to about 45% nuts.
17. The method of any preceding claim wherein said seasoned savory granola clusters produced in step b) further comprise about 4% to about 5% oil by weight of the total snack mixture and about 4% to about 5% seasoning powder by weight of the total snack mixture and further said snack mixture produced by said mixing in step d) further comprises by weight of the total snack mixture:
    about 50% to about 55% savory seasoned granola clusters;
    about 24% to about 26% peanuts; and
    about 14% to about 16% almonds.
18. The method of any preceding claim further comprising:
    providing seeds, dried fruit pieces, chocolate pieces or nutritional supplements prior to step d); and
    mixing said seeds, said dried fruit pieces, said chocolate pieces or said nutritional supplements with said seasoned savory granola clusters and said nuts in step d).
19. The method of any preceding claim wherein said snack mixture further comprises an Appearance Liking Score, Texture Liking Score, Flavor Liking Score, and Aftertaste Liking Score of at least 7.0.
20. The method of any preceding claim wherein step a) further comprises providing, by weight of the total mixture in said tumbler, about 70% to about 80% savory granola clusters, about 5% to about 15% oil and about 5% to about 15% seasoning powder.
21. The method of any preceding claim wherein said snack mixture additionally comprises per ounce of snack mixture:
    less than about 8 grams of fat;
    about 1.5 grams or less of saturated fat;
    about 0 grams of trans-fatty acids;
    less than about 240 milligrams of sodium;
    about 14 grams or less of carbohydrates;
    at least about 3 grams of fiber;
    at least about 8 grams of whole grains; and
    at least about 4 grams of protein.

22. A method of making a snack bar, said method comprising:
  a) providing savory granola clusters, oil and a seasoning powder to a tumbler;
  b) tumbling said granola clusters, said oil and said seasoning powder to produce seasoned savory granola clusters, wherein said seasoned savory granola clusters comprise about 0% to about 15% oil by weight of the total snack bar and about 0% to about 15% seasoning powder by weight of the total snack bar;
  c) providing nuts;
  d) mixing said seasoned savory granola clusters and said nuts with a binder to form a mixture, wherein said mixture comprises by weight of the total snack bar:
    about 20% to about 80% savory granola clusters and about 15% to about 50% nuts;
  e) forming said mixture into bars; and
  f) baking said bars to a moisture content of about 4% or less to form a snack bar.

23. The method of any preceding claim wherein providing said oil in step a) further comprises providing an oil selected from the group consisting of vegetable oil, peanut oil, soybean oil, sunflower oil or cottonseed oil.

24. The method of any preceding claim wherein providing said nuts in step c) further comprises providing peanuts and almonds.

25. The method of any preceding claim wherein providing said nuts in step c) further comprises providing nuts selected from the group consisting of peanuts, almonds, pistachios, cashews, Brazil nuts, pecans, hazelnuts and walnuts.

26. The method of any preceding claim wherein said seasoned savory granola clusters produced in step b) further comprise about 3% to about 8% oil by weight of the total snack bar and about 3% to about 8% seasoning powder by weight of the total snack bar and further wherein said mixture produced by said mixing in step d) further comprises by weight of the total snack bar:
  about 50% to about 60% seasoned savory granola clusters; and
  about 35% to about 45% nuts.

27. The method of any preceding claim wherein said seasoned savory granola clusters produced in step b) further comprise about 4% to about 5% oil by weight of the total snack bar and about 4% to about 5% seasoning powder by weight of the total snack bar and further said snack mixture produced by said mixing in step d) further comprises by weight of the total snack bar:
  about 50% to about 55% seasoned savory granola clusters;
  about 24% to about 26% peanuts; and
  about 14% to about 16% almonds.

28. The method of any preceding claim further comprising:
  providing seeds, dried fruit pieces, chocolate pieces or nutritional supplements prior to step d); and
  mixing said seeds, said dried fruit pieces, said chocolate pieces or said nutritional supplements with said seasoned savory granola clusters and said nuts in step d).

29. The method of any preceding claim wherein said snack mixture further comprises an Appearance Liking Score, Texture Liking Score, Flavor Liking Score, and Aftertaste Liking Score of at least 7.0.

30. The method of any preceding claim wherein step a) further comprises providing, by weight of the total mixture in said tumbler, about 70% to about 80% savory granola clusters, about 5% to about 15% oil and about 5% to about 15% seasoning powder.

31. The method of any preceding claim wherein said binder in step d) comprises soluble corn fiber.

32. The method of any preceding claim wherein said baking in step f) comprises baking at a temperature of about 300° F. to about 400° F. for about 10 minutes to about 25 minutes.

33. The method of any preceding claim wherein said baking comprises baking at a temperature of about 350° F. for about 10 minutes.

34. The method of any preceding claim wherein said forming in step e) further comprises:
  forming said mixture into a slab with a thickness of about 0.5 inches to about 1.5 inches; and
  cutting said slab into bars, wherein said bars have a length of about 3 inches to about 5 inches.

35. The method of any preceding claim wherein said slab has a thickness of about 0.75 inches and said bars have a length of about 4 inches.

36. The method of any preceding claim wherein said snack bar additionally comprises per ounce of snack bar:
  less than about 8 grams of fat;
  about 1.5 grams or less of saturated fat;
  about 0 grams of trans-fatty acids;
  less than about 240 milligrams of sodium;
  about 14 grams or less of carbohydrates;
  at least about 3 grams of fiber;
  at least about 8 grams of whole grains; and
  at least about 4 grams of protein.

We claim:

1. A snack food product comprising by weight of the total snack food product:
  about 20% to about 80% savory granola clusters coated with oil and a seasoning powder, said oil comprising about 5% to about 15% and said seasoning powder comprising about 5% to about 15%, wherein said savory granola clusters comprise a soluble corn fiber binder; and
  about 15% to about 50% nuts.

2. The snack food product of claim 1 wherein said snack food product is a snack mixture.

3. The snack food product of claim 1 wherein said snack food mixture is a snack bar.

4. The snack food product of claim 1 wherein said nuts comprise peanuts and almonds.

5. The snack food product of claim 1 wherein said nuts are selected from the group consisting of peanuts, almonds, pistachios, cashews, Brazil nuts, pecans, hazelnuts and walnuts.

6. The snack food product of claim 1 comprising by weight of the total snack food product:
  about 50% to about 60% savory granola clusters coated with oil and a seasoning powder, said oil comprising about 3% to about 8% and said seasoning powder comprising about 3% to about 8%; and
  about 35% to about 45% nuts.

7. The snack food product of claim 1 comprising by weight of the total snack food product:
  about 50% to about 55% savory granola clusters coated with oil and a seasoning powder, said oil comprising about 4% to about 5% and said seasoning powder comprising about 4% to about 5%;
  about 24% to about 26% peanuts; and
  about 14% to about 16% almonds.

8. The snack food product of claim 1 wherein said oil is selected from the group consisting of vegetable oil, peanut oil, soybean oil, sunflower oil or cottonseed oil.

9. The snack food product of claim 1 further comprising seeds, dried fruit pieces, chocolate pieces or nutritional supplements.

10. The snack food product of claim 1 further comprising an Appearance Liking Score, Texture Liking Score, Flavor Liking Score, and Aftertaste Liking Score of at least 7.0.

11. The snack food product of claim 1 additionally comprising per ounce of said snack food product:
   less than about 8 grams of fat;
   about 1.5 grams or less of saturated fat;
   about 0 grams of trans-fatty acids;
   less than about 240 milligrams of sodium;
   about 14 grams or less of carbohydrates;
   at least about 3 grams of fiber;
   at least about 8 grams of whole grains; and
   at least about 4 grams of protein.

12. A method of making a snack bar, said method comprising:
   a) providing savory granola clusters, oil and a seasoning powder to a tumbler;
   b) tumbling said granola clusters, said oil and said seasoning powder to produce seasoned savory granola clusters, wherein said seasoned savory granola clusters comprise about 5% to about 15% oil by weight of the total snack bar and 5% to about 15% seasoning powder by weight of the total snack bar;
   c) providing nuts;
   d) mixing said seasoned savory granola clusters and said nuts with a binder consisting of soluble corn fiber to form a mixture, wherein said binder imparts little to no sweetness and wherein said mixture comprises by weight of the total snack bar:
      about 20% to about 80% savory granola clusters and about 15% to about 50% nuts;
   e) forming said mixture into bars; and
   f) baking said bars to a moisture content of about 4% or less to form a snack bar.

13. The method of claim 12 wherein providing said oil in step a) further comprises providing an oil selected from the group consisting of vegetable oil, peanut oil, soybean oil, sunflower oil or cottonseed oil.

14. The method of claim 12 wherein providing said nuts in step c) further comprises providing peanuts and almonds.

15. The method of claim 12 wherein providing said nuts in step c) further comprises providing nuts selected from the group consisting of peanuts, almonds, pistachios, cashews, Brazil nuts, pecans, hazelnuts and walnuts.

16. The method of claim 12 wherein said seasoned savory granola clusters produced in step b) further comprise about 3% to about 8% oil by weight of the total snack bar and about 3% to about 8% seasoning powder by weight of the total snack bar and further wherein said mixture produced by said mixing in step d) further comprises by weight of the total snack bar:
   about 50% to about 60% seasoned savory granola clusters; and
   about 35% to about 45% nuts.

17. The method of claim 12 wherein said seasoned savory granola clusters produced in step b) further comprise about 4% to about 5% oil by weight of the total snack bar and about 4% to about 5% seasoning powder by weight of the total snack bar and further said snack mixture produced by said mixing in step d) further comprises by weight of the total snack bar:
   about 50% to about 55% seasoned savory granola clusters;
   about 24% to about 26% peanuts; and
   about 14% to about 16% almonds.

18. The method of claim 12 further comprising:
   providing seeds, dried fruit pieces, chocolate pieces or nutritional supplements prior to step d); and
   mixing said seeds, said dried fruit pieces, said chocolate pieces or said nutritional supplements with said seasoned savory granola clusters and said nuts in step d).

19. The method of claim 12 wherein said snack mixture further comprises an Appearance Liking Score, Texture Liking Score, Flavor Liking Score, and Aftertaste Liking Score of at least 7.0.

20. The method of claim 12 wherein step a) further comprises providing, by weight of the total mixture in said tumbler, about 70% to about 80% savory granola clusters, about 5% to about 15% oil and about 5% to about 15% seasoning powder.

21. The method of claim 12 wherein said baking in step f) comprises baking at a temperature of about 300° F. to about 400° F. for about 10 minutes to about 25 minutes.

22. The method of claim 21 wherein said baking comprises baking at a temperature of about 350° F. for about 10 minutes.

23. The method of claim 12 wherein said forming in step e) further comprises:
   forming said mixture into a slab with a thickness of about 0.5 inches to about 1.5 inches; and
   cutting said slab into bars, wherein said bars have a length of about 3 inches to about 5 inches.

24. The method of claim 23 wherein said slab has a thickness of about 0.75 inches and said bars have a length of about 4 inches.

25. The method of claim 12 wherein said snack bar additionally comprises per ounce of snack bar:
   less than about 8 grams of fat;
   about 1.5 grams or less of saturated fat;
   about 0 grams of trans-fatty acids;
   less than about 240 milligrams of sodium;
   about 14 grams or less of carbohydrates;
   at least about 3 grams of fiber;
   at least about 8 grams of whole grains; and
   at least about 4 grams of protein.

* * * * *